United States Patent
Bosworth

(10) Patent No.: US 12,513,102 B2
(45) Date of Patent: Dec. 30, 2025

(54) SIMULATION OF A USER OF A SOCIAL NETWORKING SYSTEM USING A LANGUAGE MODEL

(71) Applicant: Meta Platforms Technologies, LLC, Menlo Park, CA (US)

(72) Inventor: Andrew Garrod Bosworth, San Mateo, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/523,545

(22) Filed: Nov. 29, 2023

(65) Prior Publication Data

US 2025/0175448 A1 May 29, 2025

(51) Int. Cl.
*H04L 51/52* (2022.01)
*G06F 40/40* (2020.01)

(52) U.S. Cl.
CPC .............. *H04L 51/52* (2022.05); *G06F 40/40* (2020.01)

(58) Field of Classification Search
CPC ................................. H04L 51/52; G06F 40/40
USPC ......................................................... 709/201
See application file for complete search history.

(56) References Cited

U.S. PATENT DOCUMENTS

| | | | |
|---|---|---|---|
| 12,093,965 B1 * | 9/2024 | Shapiro | G06Q 30/015 |
| 2016/0225030 A1 * | 8/2016 | Iyer | G06Q 30/0269 |
| 2020/0026755 A1 | 1/2020 | Hewitt et al. | |
| 2020/0126174 A1 | 4/2020 | Halse et al. | |
| 2023/0172510 A1 * | 6/2023 | Alford | A61B 5/167 434/236 |
| 2023/0267558 A1 * | 8/2023 | Adibowo | G06Q 30/016 705/304 |

FOREIGN PATENT DOCUMENTS

WO WO-2024015633 A2 * 1/2024 ............. G06F 40/30

OTHER PUBLICATIONS

International Search Report and Written Opinion for International Application No. PCT/US2024/045744, mailed Nov. 14, 2024, 10 pages.

* cited by examiner

*Primary Examiner* — Glenford J Madamba
(74) *Attorney, Agent, or Firm* — Seyfarth Shaw LLP

(57) ABSTRACT

A social networking system simulates a user using a language model trained using training data generated from user interactions performed by that user. The language model may be used for simulating the user when the user is absent from the social networking system, for example, when the user takes a long break or if the user is deceased. The social networking system receives a language model that is pre-trained and retrains the language model using user specific training data based on user interactions performed by a particular user with the social networking system. The social networking system deploys the language model retrained using the user specific training data so that a bot can invoke the language model for generating responses on behalf of the user in response to content items posted by other users.

18 Claims, 4 Drawing Sheets

400

```
Deploy a language model trained for a target
user
410
            │
            ▼
┌─── REPEAT ──────────────────────────────────┐
│                                             │
│   Receive content relevant to the target    │
│   user generated by other users             │
│   420                                       │
│            │                                │
│            ▼                                │
│   Provide information describing the        │
│   received content and context to           │
│   language model                            │
│   430                                       │
│            │                                │
│            ▼                                │
│   Execute language model to generate a      │
│   response for the content item             │
│   440                                       │
│            │                                │
│            ▼                                │
│   Post generated response for the content   │
│   item                                      │
│   450                                       │
│                                             │
└─────────────────────────────────────────────┘
```

FIG. 4

SIMULATION OF A USER OF A SOCIAL NETWORKING SYSTEM USING A LANGUAGE MODEL

FIELD OF INVENTION

This disclosure concerns machine learning based models in general and more specifically simulation of a user of a social networking system using a machine learning based language model.

BACKGROUND

Social networking systems allow users to connect with other users and interact with them. For examples users may post content, respond to content posted by other users, for example, by commenting, liking, forwarding, or performing other interactions with the content on the social networking system. Several users may be connected to a particular user or follow the user to receive content generated by the user. If that user is absent from the social networking platform, the users connected to the user do not receive any content from the user during that user's absence. A user may be absent from the social networking platform for long period of time, thereby affecting the user experience of several users on the social networking system. The impact on the users is much more severe and permanent if that user is deceased and can never return to the social networking platform.

SUMMARY

Embodiments simulate a user of a social networking system using a language model trained using training data generated from user interactions performed by that user. The language model may be used for simulating the user when the user is absent from the social networking system, for example, when the user takes a long break. The language model may be used for simulating a user that is deceased.

The social networking system receives a language model trained using training data obtained from user interactions performed by a target user of the social networking system. The social networking system receives a set of content items posted by other users that are relevant to the target user, for example, content items provided in a newsfeed generated for the target user. The social networking system identifies a content item relevant to the target user from the set of content items.

The social networking system generates a response to the content item on behalf of the user as follows. The social networking system generates a prompt for the language model. The prompt describes the content item and requests a user interaction that the target user would have performed upon viewing the content item. The social networking system executes the language model using the prompt and receives a response from the language model. The social networking system extracts information describing the predicted user interaction from the response generated by the language model and posts an indication of the user interaction on the social networking system.

According to an embodiment, the social networking system trains the language model as follows. The social networking system receives a language model that is pretrained and retrains the language model using user specific training data based on user interactions performed by a target user with the social networking system. The social networking system deploys the language model retrained using the user specific training data. For example, the deployed language model can be subsequently invoked by a bot that performs user interactions on behalf of the target user.

According to an embodiment, the social networking system receives permissions from the target user indicating whether the target user allows or disallows a particular type of user interaction for training the language model. The training data is collected in accordance with the permissions. For example, the target user may indicate that comments posted on content items may be used for training the language model but messages to individual connections may not be used as training data.

BRIEF DESCRIPTION OF THE DRAWINGS

FIG. 4 illustrates the process for simulating a social networking user based on the language model, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
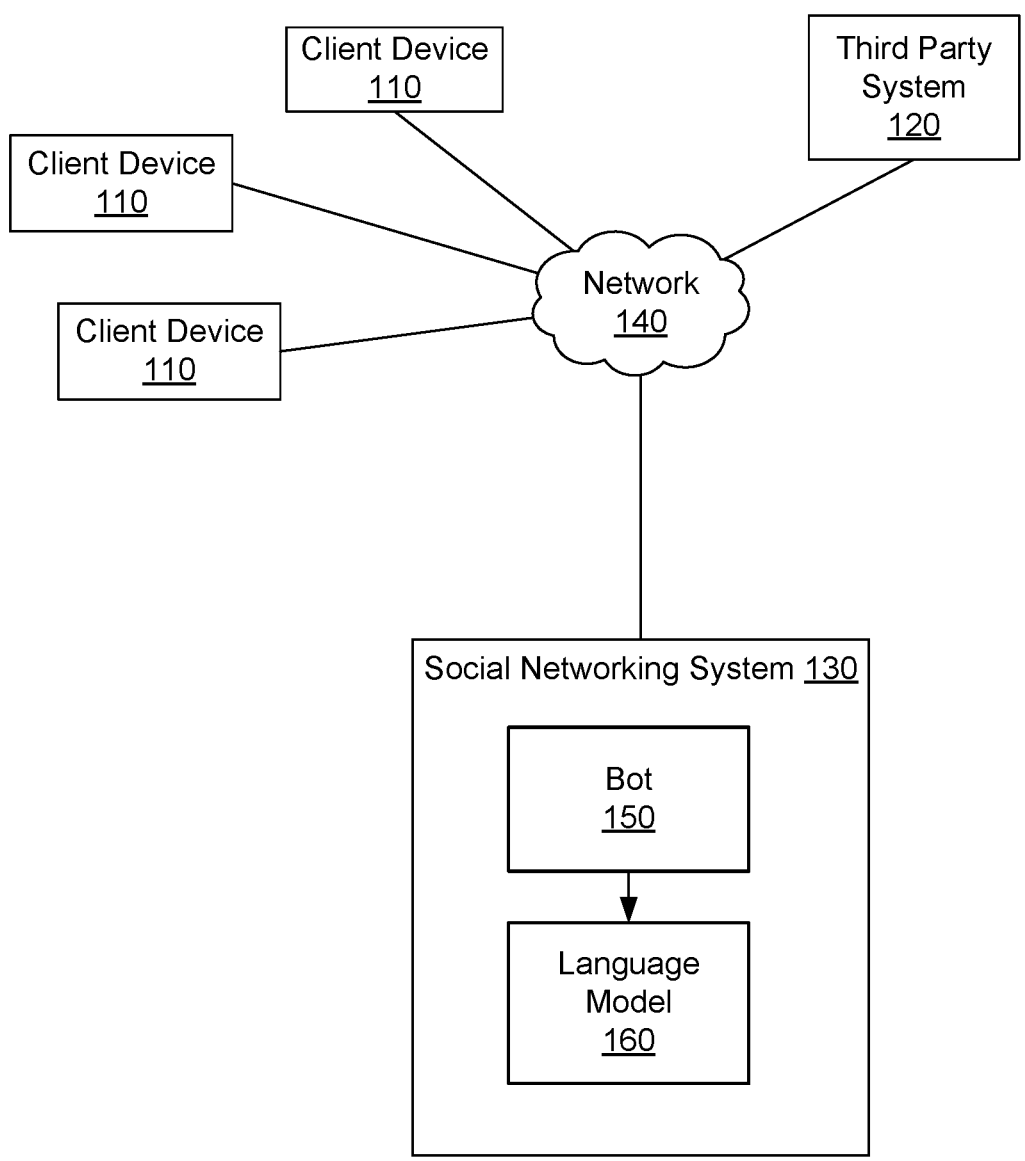
FIG. 1 is a block diagram of a system environment for a social networking system 130, in accordance with one or more embodiments.

FIG. 1 is a block diagram of a system environment 100 for a social networking system 130, in accordance with one or more embodiments. The system environment 100 shown by FIG. 1 comprises one or more client devices 110, a third-party system 120, social networking system 130, and a network 140. The social networking system 130 provides a framework for simulating a user of the social networking system 130. In alternative configurations, different and/or additional components may be included in the system environment 100. For example, the social networking system 130 is a social networking system, a content sharing network, or another system providing content to users.

The social networking system 130 comprises one or more computer systems that include software and hardware for performing a group of coordinated functions or tasks. The social networking system 130 is configured to receive requests from one or more client devices 110 and execute computer programs associated with the received requests. As an example, the social networking system 130 stores content associated with one or more users and information describing user interactions with other users via the social networking system. For example, a user may access content posted by other users as well as post content including text, images, videos, and so on. Software executing on the social networking system 130 can include a complex collection of computer programs, libraries, and related data that are written in a collaborative manner, in which multiple parties or teams are responsible for managing different components of the software.

According to an embodiment, the social networking system 130 includes a bot 150 that interacts with a language model 160. The bot 150 is configured to monitor content relevant to a target user and perform interactions with the social networking system 130 on behalf of the target user. For example, the bot 150 may monitor newsfeed generated by the social networking system 130 for the target user. For a particular newsfeed item, the bot 150 determines a response that the target user would provide and sends the response via the social networking system 130 on behalf of the target user.

The bot 150 executes the language model 160 to analyze content relevant to the target user posted by other users of the social networking system 130 and to generate corresponding responses on behalf of the target user. The bot 150 may be used to simulate the target user of the social networking system 130 when the target user is absent from the social networking system 130. For example, if the target user in travelling and user does not have access to the social networking system 130, the bot 150 can continue to interact with the social networking system 130.

The language model 160 is trained based on past user interactions by the target user and therefore generates responses and content that the target user would have provided in a given context if the target user was available to respond. As a result, the other users may not notice an absence of the target user even though the responses are generated by the bot 150. It is possible that a target user is deceased and the bot 150 is used to continue simulating the target user. As a result, other users can continue to experience the presence of the target user in spite of the fact that that the target user is deceased.

While only three client devices 110a, 110b, and 110c are illustrated in conjunction with FIG. 1, there may be multiple instances of each of these entities. A user may use a client device 110 to interact with the social networking system 130, for example, by posting content to the social networking system or by viewing content posted by other users on the social networking system. The client devices 110 are one or more computing devices capable of receiving user input as well as transmitting and/or receiving data via the network 140. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 140. In one embodiment, a client device 110 executes an application allowing a user of the client device 110 to interact with the social networking system 130. For example, a client device 110 executes a browser application to enable interaction between the client device 110 and the social networking system 130 via the network 140. In another embodiment, a client device 110 interacts with the social networking system 130 through an application programming interface (API) running on a native operating system of the client device 110, such as IOS® or ANDROID™.

One or more third-party systems 120 may be coupled to the network 140 for communicating with the social networking system 130. In one embodiment, a third-party system 120 allows a user to communicate with other users using channels outside of the social networking system 130. For example, a third-party system 120 may allow users of the social networking system 130 to interact with other users via email, messages, voice messages, and so on. A third-party system 120 may have an agreement with the social networking system 130 and with a user's consent, provide information describing user communications or other interactions based on the third-party system 120 to the social networking system 130. This information may be used as training data for training of the language model 160.

The client devices 110 and the third-party system 120 are configured to communicate with the social networking system 130 via the network 140. The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

System Architecture

Figure 2:
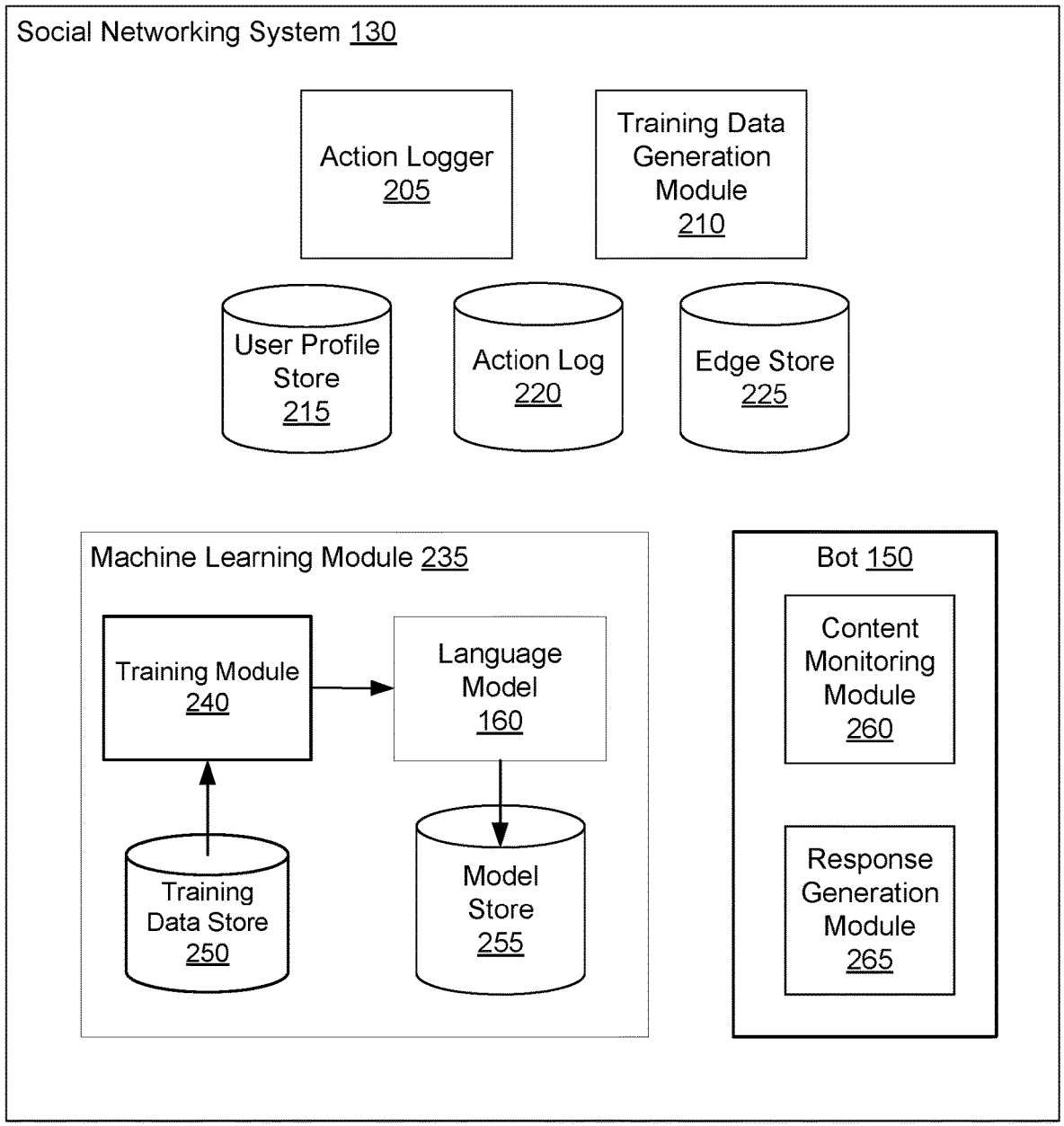
FIG. 2 is a block diagram of a system architecture of the social networking system 130, in accordance with one or more embodiments.

FIG. 2 is a block diagram 200 of a system architecture of the social networking system 130, in accordance with one or more embodiments. The social networking system 130 shown in FIG. 2 includes an action logger 205, a training data generation module 210, an edge store 225, a user profile store 215, an action log 220, a machine learning module 235, and the bot 150. In still other embodiments, the social networking system 130 may include additional, fewer, or different components for various applications. Conventional components such as network interfaces, security functions, load balancers, failover servers, management and network operations consoles, and the like are not shown so as to not obscure the details of the system architecture.

Each user of the social networking system 130 is associated with a user profile. Content associated with the user profile is stored in the user profile store 215. A user profile includes declarative information about the user that was explicitly shared by the user and may also include profile information inferred by the social networking system 130. In one embodiment, a user profile includes multiple data fields, each describing one or more attributes of the corresponding social networking system user. Examples of information stored in a user profile include biographic, demographic, and other types of descriptive information, such as work experience, educational history, gender, interests, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user.

The action logger 205 receives communications about user actions internal to and/or external to the social networking system 130, populating the action log 220 with information about user actions. The action log 220 may be used by the social networking system 130 to track user actions on the social networking system 130, as well as actions on third-party systems 120 that communicate information to the social networking system 130. Users may interact with various objects on the social networking system 130, and information describing these interactions is stored in the action log 220. Examples of interactions include, commenting on posts, accessing a content item, liking a content item, sharing a content item, commenting on a page, sharing links, checking-in to physical locations via a client device 110, and any other interaction. Additional examples of interactions with objects on the social networking system 130 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction.

The action log 220 may also store user actions taken on a third-party system 120, such as an external website, and communicated to the social networking system 130. For example, an e-commerce website may recognize a user of the social networking system 130 through a social plug-in enabling the e-commerce website to identify the user of the social networking system 130. Because users of the social networking system 130 are uniquely identifiable, e-commerce websites, such as in the preceding example, may communicate information about a user's actions outside of the social networking system 130 to the social networking system 130 for association with the user. Hence, the action log 220 may record information about actions users perform on a third-party system 120, including webpage viewing histories, advertisements that were engaged, purchases made, and other patterns from shopping and buying. Additionally, actions a user performs via an application associated with a third-party system 120 and executing on a client device 110 may be communicated to the action logger 205 by the application for recordation and association with the user in the action log 220.

In one embodiment, the edge store 225 stores information describing connections between users and other objects on the social networking system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 130, such as expressing interest in a page on the social networking system 130, sharing a link with other users of the social networking system 130, and commenting on posts made by other users of the social networking system 130. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

The edge store 225 also stores information about edges, such as affinity scores for objects, interests, and other users. Affinity scores, or "affinities," may be computed by the social networking system 130 over time to approximate a user's interest in an object or in another user in the social networking system 130 based on the actions performed by the user. A user's affinity may be computed by the social networking system 130 over time to approximate the user's interest in an object, in a topic, or in another user in the social networking system 130 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 215, or the user profile store 215 may access the edge store 225 to determine connections between users.

The machine learning module 235 trains the language model 160. The machine learning module 235 includes a training data store 250, a training module 240, the language model 160, and a model store 255. According to an embodiment, the machine learning module 235 receives a pretrained language model. The pretrained language model was previously trained using generic data that is not user specific. The training module 240 trains the language model 160 using training data that is specific to a target user. The training of the pretrained language model based on user specific training data generates a user specific language model that is trained to simulate the target user.

According to various embodiments, the training module 240 trains the language model 160 by adjusting the parameters of the language model 160 to minimize a loss function for the training data specific to the target user. The training module 240 may use a technique such as gradient descent to adjust the parameters. The parameters of the trained language model 160 are stored in the model store 255. According to an embodiment, the machine learning module performs reinforcement learning with human feedback (RLHF) to train the model with feedback from the target user.

The training data store 250 stores user specific training data. For example, the training data store 250 stores training data generated from user interactions with the social networking system 130 performed by a particular user. These user interactions performed by a specific user include commenting on posts, liking content items, sharing content items, posting content items, sending messages to other users, going to an event, broadcasting messages on a wall, and so on. The training data store 250 may store training data for multiple users. The training data for a specific user is associated with a user identifier of the target user. Accordingly, the training data for a particular user can be obtained by filtering the data based on that user's identifier.

The training data generation module 210 generates training data for training the language model 160. According to an embodiment, the training data generation module 210 obtains permissions from the target user indicating the type of social networking data that can be used for training the language model 160 for the target user. For example, the social networking system 130 may present a user interface to the target user displaying various types of user interactions, such as, commenting on posts, sending messages to users, liking comments, sharing comments, and so on. The target user can use the user interface to select the types of user interactions that the target user allows the social networking system to use as training data for training the language model 160 and the types of user interactions that the target user disallows from being used as training data. A user my decide not to allow use of messages to individual users but may allow using broadcast messages on the wall for training the language model. The target user may identify a set of users and disallow user interactions with those users to be used for training the language model 160. For example, the target user may disallow messages sent to connections marked as family members from being used as training data but allow messages sent to connections marked as friends to be used as training data for training the language model. The training data generation module 210 monitors user interactions that are allowed by the target user based on the user permissions and collects them and stores them in the training data store 250. The user interactions of the types disallowed by the target user are not included in the training data.

Once the language model 160 is trained, the language model 160 can be deployed so that the bot 150 is able to invoke the language model 160 for a specific user. The bot 150 includes a content monitoring module 260 and a response generation module 265. The content monitoring module 260 monitors the content of the social networking system 130 that is likely to be of interest to the target user, for example, content items selected for presentation to the target user via a newsfeed. The content monitoring module 260 ranks the content items relevant to the target user and selects at least a subset of the content items for generating a response on behalf of the target user.

The response generation module 265 receives a content item relevant to the target user and processes the information describing the content item to generate a feature vector. The response generation module 265 generates a prompt for the language model 160 based on the information describing the content item as well as any contextual information relevant to the content item. The response generation module 265 provides the prompt to the language model 160 specific to the target user to generate a response that the target user is likely to have generated if the target user viewed the same content item.

The response generation module 265 generates a response based on the output of the language model 160 and posts the response on the social networking system. For example, if the content item relevant to the target user is an image, the response generation module 265 may determine based on the language model 160 that the target user would have liked the image. Accordingly, the response generation module 265 invokes an API of the social networking system to like the content item on behalf of the target user, thereby indicating on the social networking system that the target user liked the content item. Alternatively, the response generation module 265 may determine based on the language model 160 that the target user would comment on the image. The response generation module 265 further determines based on the language model 160 that comment that the target user would have posted on the image. The response generation module 265 invokes an API of the social networking system to post the comment on the content item on behalf of the target user, thereby indicating on the social networking system that the target user commented on the content item.

According to an embodiment, the machine learning module 235 trains multiple language models for the same target user. Each language model corresponds to a different age for the target user. For example, a language model L1 is trained to simulate the target user's behavior when the target user was 20 years old, a language model L2 is trained to simulate the target user's behavior when the target user was 25 years old, a language model L3 is trained to simulate the target user's behavior when the target user was 30 years old, and so on. The language model L corresponding to an age N is trained using the user interactions performed by the target user with the social networking system until the point-in-time when the target user reached that particular age N. The social networking system may be configured to simulate the target user's behavior when the target user was of one of the above age values.

Training Process

Figure 3:
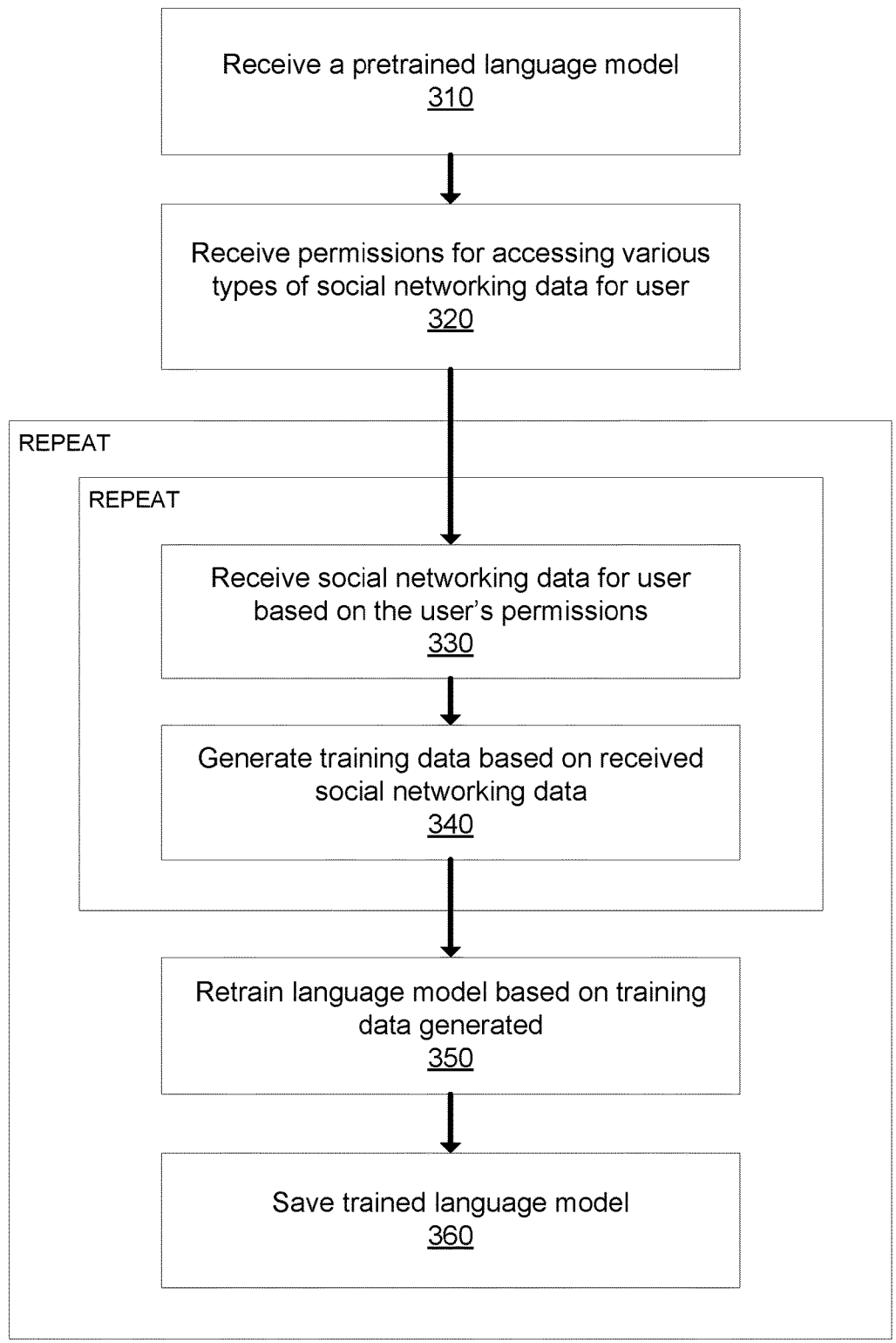
FIG. 3 illustrates a process for training a language model for simulating a social networking user, in accordance with an embodiment.

FIG. 3 illustrates a process for training a language model for simulating a social networking user, in accordance with an embodiment. Other embodiments may include more or fewer steps than indicated in FIG. 3. The steps may be executed in an order different from that indicated in FIG. 3. The steps may be performed by module of the social networking system, for example, the machine learning module 235.

The machine learning module 235 receives 310 a pre-trained language model. The pre-trained model is trained using data that is not specific to any user and trains the model to perform predictions in a user independent manner. The language model is trained to receive a text as input and predict a next word for the text. The language model is repeatedly invoked to make predictions representing answers for prompts.

The machine learning module 235 receives permissions for accessing various types of social networking data for the target user. The permissions provided by the target user may be stored in the user profile store 215. The training data generation module 210 receives social networking data for a user based on the target user's permissions. Accordingly, the training data generation module 210 obtains social networking data representing user interactions with the social networking system performed by the target user, assuming the target user has granted permissions to the social networking system 130 to collect that type of social networking data for training the language model 160. The training data generation module 210 generates 340 training data based on the received social networking data. The training data generated is stored in the training data store 250. The steps 330 and 340 are repeatedly executed as the target user performs interactions with the social networking system, for example, user interactions with various types of content items determined to be relevant to the target user.

The training module 240 retrains 350 the language model based on the training data specific to the target user generated by the training data generation module 210. The retraining process adjusts the parameters of the language model to minimize a loss between predicted outputs and known outputs of the training data. The parameters may be adjusted based on a process such as gradient descent. The training module 240 saves 360 the parameters of the trained language model in the model store 255. The steps 350 and 360 may be repeated periodically, for example, based on a regular schedule or after more than a threshold amount of new training data is generated compared to a previous execution of the steps 350 and 360.

User Simulation Process

FIG. 4 illustrates the process for simulating a social networking user based on the language model, in accordance with an embodiment. Other embodiments may include more or fewer steps than indicated in FIG. 4. The steps may be executed in an order different from that indicated in FIG. 4. The process may be executed by modules of the social networking system, for example, the bot 150.

The trained language model is deployed 410 for use by the bot 150. The language model 160 is trained to simulate a target user. The language model 160 may be made available as a service via APIs (application programming interfaces) available for being invoked by the bot. The bot 150 repeats the steps 420, 430, 440, 450 multiple times. The content monitoring module 260 of the bot 150 receives 420 content generated by other users that the social networking system 130 determines to be relevant to the target user. For example, the content may be an image, a video, or text content such as comments posted by users, or a story posted by a user that the social networking system 130 determines to be relevant to the target user. The content may be provided as newsfeed for the target user.

The response generation module 265 of the bot 150 provides information describing the received content item and relevant contextual information to the language model 160. For example, the response generation module 265 may generate a prompt for the language model 160 requesting the language model determine how the target user would respond if the target user viewed the content item in the particular context.

The context for the content item may include one or more previous content items relevant to the content item. For example, if the content item is a comment posted by a user, the context may describe a previously posted content item, for example, an image for which the comment was posted by the target user.

The contextual information may include information describing a connection between a user that provided the content item and the target user. For example, if the other user that provided the content item is marked as a particular type of family relation, the type of family relation is specified in the prompt. Accordingly, if the same content item was posted by a user U2 instead of a user U1, the language model would generate a different response depending on the type of relation between each of the users U1 and U2 and the target user. For example, if user U1 is a family member and user U2 is a friend, the language model would generate a different response for the same content item being posted. The contextual information may also specify a measure affinity between the target user and the user who posted the content item. Accordingly, the language model may generate a different response for content posted by users having high affinity with the target user as compared to users having low affinity with the target user.

The contextual information may describe the other user that posted the content item, for example, user profile attributes of the user. These may include age of the user, ethnicity of the user, gender of the use, relationship status of the user, and so on. The language model would generate a different response depending on the user profile attributes of the user that posted the content item. The contextual information provided in the prompt may indicate if the content item was posted within a threshold number of days of a particular event, for example, a birthday of the target user or the other user that posted the content item, a particular holiday such as thanksgiving or Christmas.

The language model 160 is executed 440 to generate a response that the target user would have posted for the content item. The social networking system 130 posts an indication of the response to the content item. For example, the language model 160 may generate a response representing a comment for a content item and the social networking system posts the comment for the content item. The language model 160 may generate a response indicating that the target user may like the content item and the social networking system posts an indication of a like operation by the target user for the content item.

According to an embodiment, the bot 150 performs direct interactions with specific users, for example, a chat or direct messaging. According to an embodiment, the responses generated by the language model are converted to audio signal to perform an audio call with a user. According to an embodiment, a video generation model generates a video of the target user combined with audio signal generated from text generated by the language model to simulate a video call with the target user.

According to an embodiment, the responses generated on behalf of the target user by the bot 150 using the language model indicate that the responses were not actually generated by the target user but were instead automatically generated by a simulation of the user.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a language model trained using training data obtained from user interactions performed by a target user of a social networking system;
   receiving a set of content items posted on the social networking system that are relevant to the target user, wherein a first content item of the set of content items is posted by a second user of the social networking system, the set of content items being obtained from a newsfeed provided to the target user by the social networking system;
   identifying a second content item relevant to the target user from the set of content items based on a ranking of the second content item in relation to rankings of other content items of the set of content items;
   transmitting a prompt to the language model to obtain an output from the language model, the prompt describing the second content item and contextual information associated with the second content, and requesting the language model to recommend a user interaction with the second content item that the target user would be predicted to have performed upon viewing the second content item on the newsfeed, the user interaction including one or both of an interaction with the second content item or a textual response to the second content item;
   receiving the user interaction from the language model in accordance with transmitting the prompt to the large language model; and
   interacting with the second content in accordance with the user interaction.

2. The method of claim 1, further comprising:
   receiving a second language model that is pretrained;
   retraining the second language model using user specific training data based on user interactions performed by the target user with the social networking system; and
   deploying the second language model retrained using the user specific training data.

3. The method of claim 2, further comprising:
   receiving permissions from the target user specifying whether the target user allows or disallows a particular user interaction associated with training the language model, wherein the training data is obtained in accordance with the permissions.

4. The method of claim 1, further comprising:
   receiving a second language model that is pretrained; and
   retraining the second language model to obtain a plurality of language models, the plurality of language models trained to simulate the target user at a particular age of the target user, wherein the language model is one of the plurality of language models.

5. The method of claim 4, wherein a particular language model corresponding to the particular age of the target user is trained using training data obtained by the social networking system up to a point-in-time when the target user reached the particular age.

6. The method of claim 1, wherein the contextual information comprises information describing one or more user interactions associated with the second content item.

7. The method of claim 1, wherein the contextual information comprises information describing a social networking connection between the target user and a user that posted the second content item.

8. A non-transitory computer readable storage medium comprising instructions that when executed by one or more processors causes the one or more processors to:
   receive a language model trained using training data obtained from user interactions performed by a target user of a social networking system;
   receive a set of content items posted on the social networking system that are relevant to the target user, wherein a first content item of the set of content items is posted by a second user of the social networking system, the set of content items being obtained from a newsfeed provided to the target user by the social networking system;
   identify a second content item relevant to the target user from the set of content items based on a ranking of the second content item in relation to rankings of other content items of the set of content items;
   transmit a prompt to the language model to obtain an output from the language model, the prompt describing the second content item and contextual information associated with the second content, and requesting the language model to recommend a user interaction with the second content item that the target user would be predicted to have performed upon viewing the second content item on the newsfeed, the user interaction including one or both of an interaction with the second content item or a textual response to the second content item;
   receive the user interaction from the language model in accordance with transmitting the prompt to the large language model; and
   interact with the second content in accordance with the user interaction.

9. The non-transitory computer readable storage medium of claim 8, wherein the instructions further cause the one or more processors to:
   receive a second language model that is pretrained;
   retrain the second language model using user specific training data based on user interactions performed by the target user with the social networking system; and
   deploy the second language model retrained using the user specific training data.

10. The non-transitory computer readable storage medium of claim 9, wherein the instructions further cause the one or more processors to:
    receive permissions from the target user specifying whether the target user allows or disallows a particular user interaction associated with training the language model, wherein the training data is obtained in accordance with the permissions.

11. The non-transitory computer readable storage medium of claim 8, wherein the instructions further cause the one or more processors to:
    receive a second language model that is pretrained; and
    retrain the second language model to obtain a plurality of language models, the plurality of language models trained to simulate the target user at a particular age of the target user, wherein the language model is one of the plurality of language models.

12. The non-transitory computer readable storage medium of claim 11, wherein a particular language model corresponding to the particular age of the target user is trained using training data obtained by the social networking system up to a point-in-time when the target user reached the particular age.

13. The non-transitory computer readable storage medium of claim 8, wherein the contextual information comprises information describing one or more user interactions associated with the second content item.

14. The non-transitory computer readable storage medium of claim 8, wherein the contextual information comprises information describing a social networking connection between the target user and a user that posted the second content item.

15. A computer system comprising:
one or more processors; and
a non-transitory computer readable storage medium comprising instructions that when executed by the one or more computer processors causes the one or more processors to:
receive a language model trained using training data obtained from user interactions performed by a target user of a social networking system;
receive a set of content items posted on the social networking system that are relevant to the target user, wherein a first content item of the set of content items is posted by a second user of the social networking system, the set of content items being obtained from a newsfeed provided to the target user by the social networking system;
identify a second content item relevant to the target user from the set of content items based on a ranking of the second content item in relation to rankings of other content items of the set of content items;
transmit a prompt to the language model to obtain an output from the language model, the prompt describing the second content item and contextual information associated with the second content, and requesting the language model to recommend a user interaction with the second content item; that the target user would be predicted to have performed upon viewing the second content item on the newsfeed, the user interaction including one or both of an interaction with the second content item or a textual response to the second content item;
receive the user interaction from the language model in accordance with transmitting the prompt to the large language model; and
interact with the second content in accordance with the user interaction.

16. The computer system of claim 15, wherein the instructions further cause the one or more processors to perform:
receiving a second language model that is pretrained;
retraining the second language model using user specific training data based on user interactions performed by the target user with the social networking system; and
deploying the second language model retrained using the user specific training data.

17. The computer system of claim 16, wherein the instructions further cause the one or more processors to perform:
receiving permissions from the target user specifying whether the target user allows or disallows a particular user interaction associated with training the language model, wherein the training data is obtained in accordance with the permissions.

18. The computer system of claim 15, wherein the instructions further cause the one or more processors to perform:
receiving a second language model that is pretrained; and
retraining the second language model to obtain a plurality of language models, the plurality of language models trained to simulate the target user at a particular age of the target user, wherein the language model is one of the plurality of language models.

* * * * *